United States Patent
Seong et al.

(10) Patent No.: US 12,455,116 B2
(45) Date of Patent: Oct. 28, 2025

(54) TUBE MODULE AND TUBE ASSEMBLY INCLUDING SAME

(71) Applicant: LG Energy Solution, Ltd., Seoul (KR)

(72) Inventors: Eun Kyu Seong, Daejeon (KR); Young Min Ko, Daejeon (KR); Jun Seok Nho, Daejeon (KR); Jong Seol Yoon, Daejeon (KR); Myoung Hwan Oh, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 423 days.

(21) Appl. No.: 17/926,773

(22) PCT Filed: Jun. 4, 2021

(86) PCT No.: PCT/KR2021/007045
§ 371 (c)(1),
(2) Date: Nov. 21, 2022

(87) PCT Pub. No.: WO2021/246831
PCT Pub. Date: Dec. 9, 2021

(65) Prior Publication Data
US 2023/0213281 A1 Jul. 6, 2023

(30) Foreign Application Priority Data

Jun. 5, 2020 (KR) .................. 10-2020-0068508
Sep. 25, 2020 (KR) .................. 10-2020-0125179
Sep. 25, 2020 (KR) .................. 10-2020-0125180

(51) Int. Cl.
*F27B 7/34* (2006.01)
*F27B 7/02* (2006.01)
(Continued)

(52) U.S. Cl.
CPC .................. *F27B 7/34* (2013.01); *F27B 7/02* (2013.01); *F27B 7/04* (2013.01); *F27B 7/08* (2013.01);
(Continued)

(58) Field of Classification Search
CPC ...... F27B 7/34; F27B 7/02; F27B 7/04; F27B 7/08; F27B 7/10; F27B 7/16; F27B 7/167;
(Continued)

(56) References Cited

U.S. PATENT DOCUMENTS 2,288,372 A * 6/1942 Rump .................. F27B 7/00
432/118
5,038,019 A 8/1991 McEntire et al.
(Continued)

FOREIGN PATENT DOCUMENTS

CN 102889787 A 1/2013
CN 205207983 U * 5/2016
(Continued)

OTHER PUBLICATIONS

CN-107883761-A translation (Year: 2018).*
(Continued)

*Primary Examiner* — Steven S Anderson, II
*Assistant Examiner* — Kurt Wolford
(74) *Attorney, Agent, or Firm* — Lerner David LLP

(57) ABSTRACT

A tube module has a tube having a bore and made of a ceramic material; a heat insulator surrounding an outer circumferential surface of the tube and made of a ceramic material; and a flange provided along an edge of each of both surfaces of the heat insulator and formed in a band shape.

23 Claims, 19 Drawing Sheets

(51) Int. Cl.
  *F27B 7/04* (2006.01)
  *F27B 7/08* (2006.01)
  *F27B 7/10* (2006.01)
  *F27B 7/16* (2006.01)
  *F27B 7/28* (2006.01)
  *H01M 4/04* (2006.01)
  *H05B 6/80* (2006.01)
  *F27D 99/00* (2010.01)
  *H01M 4/02* (2006.01)

(52) U.S. Cl.
  CPC ............... *F27B 7/10* (2013.01); *F27B 7/16* (2013.01); *F27B 7/167* (2013.01); *F27B 7/28* (2013.01); *H01M 4/0471* (2013.01); *H05B 6/80* (2013.01); *F27B 2007/022* (2013.01); *F27D 2099/0028* (2013.01); *H01M 2004/028* (2013.01)

(58) Field of Classification Search
  CPC ... F27B 7/28; F27B 2007/022; H01M 4/0471; H01M 2004/028; H05B 6/80; F27D 2099/0028
  See application file for complete search history.

(56) References Cited

U.S. PATENT DOCUMENTS

| | | | |
|---|---|---|---|
| 2005/0038019 A1 | 2/2005 | Beck | |
| 2005/0247443 A1 | 11/2005 | Kim | |
| 2013/0200071 A1 | 8/2013 | Mathis | |
| 2018/0051876 A1* | 2/2018 | Donegan | F23G 5/027 |

FOREIGN PATENT DOCUMENTS

| | | | | |
|---|---|---|---|---|
| CN | 105157424 | B | 4/2017 | |
| CN | 107883761 | A * | 4/2018 | F27B 7/20 |
| CN | 110375544 | A | 10/2019 | |
| DE | 19752728 | A1 | 6/1999 | |
| FR | 2473578 | A1 * | 7/1981 | |
| GB | 2263967 | A | 8/1993 | |
| JP | S6460988 | A | 3/1989 | |
| JP | H01300187 | A | 12/1989 | |
| JP | H05203362 | A * | 8/1993 | |
| JP | H10272534 | A | 10/1998 | |
| JP | H10286544 | A | 10/1998 | |
| JP | 2003187947 | A * | 7/2003 | |
| JP | 2003292964 | A | 10/2003 | |
| JP | 2005098553 | A | 4/2005 | |
| JP | 2013112704 | A | 6/2013 | |
| JP | 2016038140 | A | 3/2016 | |
| JP | 5964899 | B2 | 8/2016 | |
| KR | 950010199 | B1 | 9/1995 | |
| KR | 20010075210 | A | 8/2001 | |
| KR | 20040069156 | A | 8/2004 | |
| KR | 200391785 | Y1 | 8/2005 | |
| KR | 20050104180 | A | 11/2005 | |
| KR | 20130112894 | A | 10/2013 | |
| KR | 20130137911 | A | 12/2013 | |
| KR | 102054946 | B1 | 12/2019 | |
| KR | 20200026567 | A | 3/2020 | |
| WO | WO-2021141704 | A1 * | 7/2021 | B22F 3/003 |

OTHER PUBLICATIONS

CN-205207983-U translation (Year: 2016).*
FR-2473578-A1 translation (Year: 1981).*
JP-2003187947-A translation (Year: 2003).*
JP-H05203362-A translation (Year: 1993).*
American_flanged_joint_pipe_2011.pdf (Year: 2011).*
Atlantic flange_gaskets_2019.pdf (Year: 2019).*
Moore_design_features_of_rotary_kilns_2013.pdf (Year: 2013).*
Extended European Search Report including Written Opinion for Application No. 21818531.2 dated Oct. 9, 2023, pp. 1-8.
International Search Report for PCT/KR2021/007045 mailed Sep. 14, 2021. 3 pgs.

* cited by examiner

[FIG. 1]
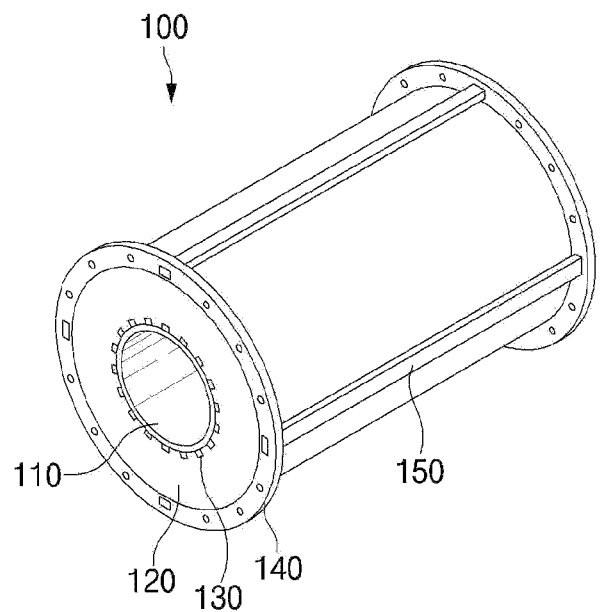
[FIG. 2]
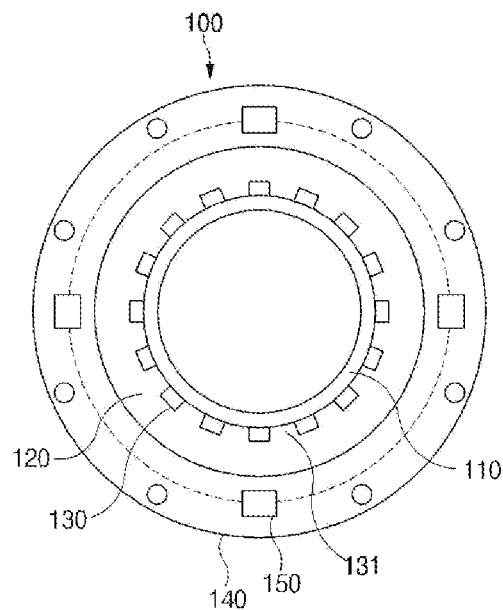

[FIG. 3]
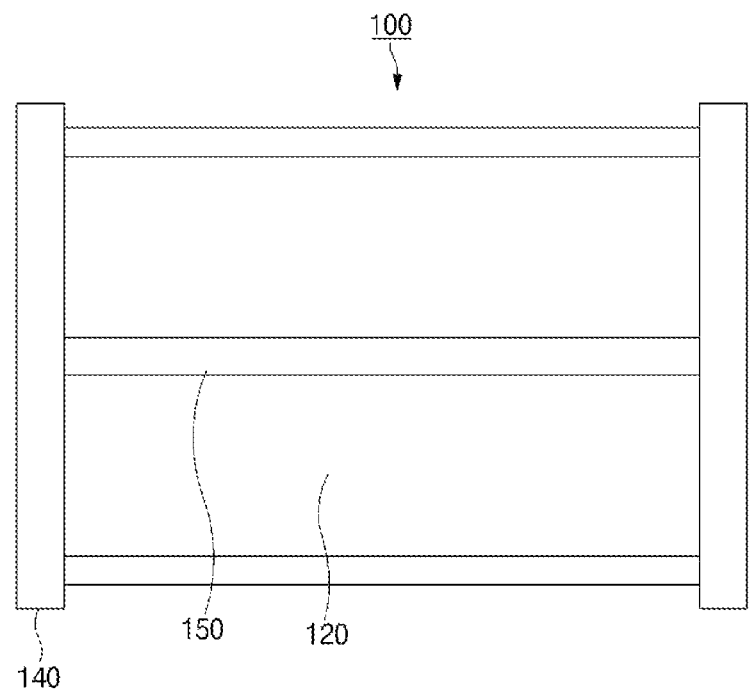

[FIG. 4]
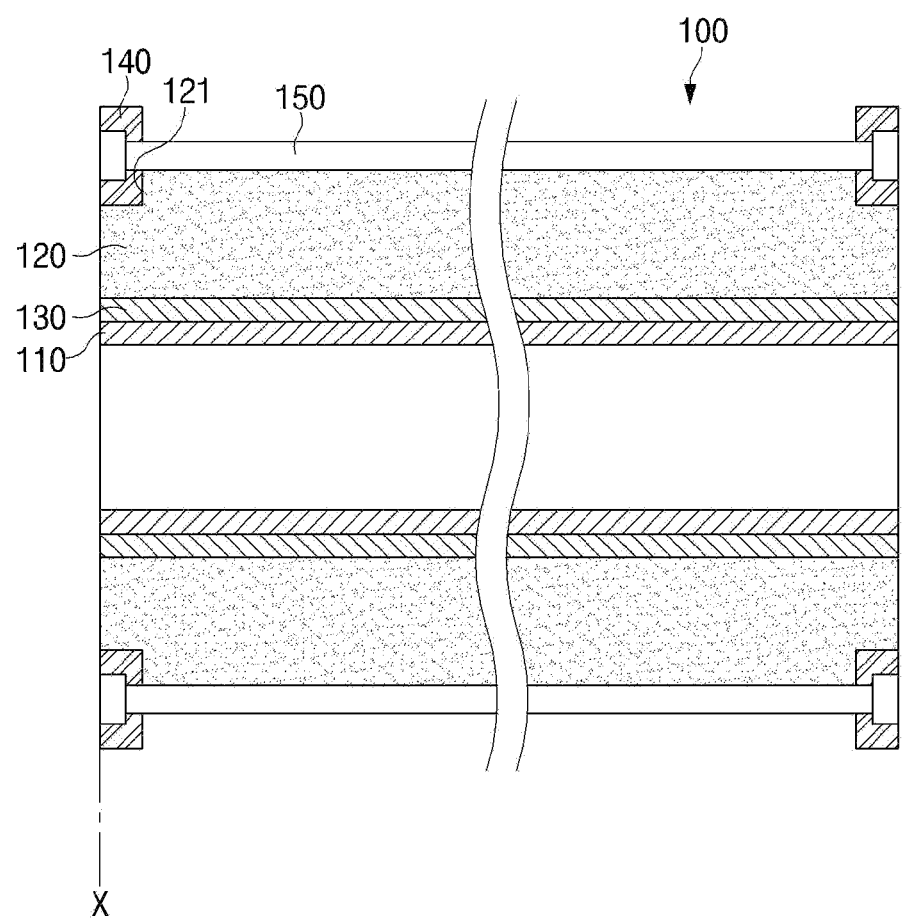

[FIG. 5]
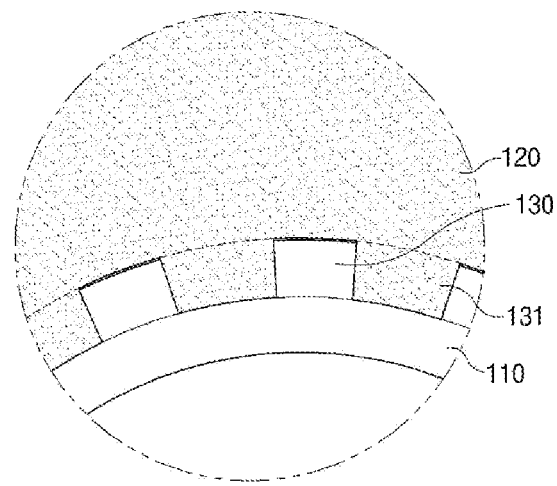
[FIG. 6]
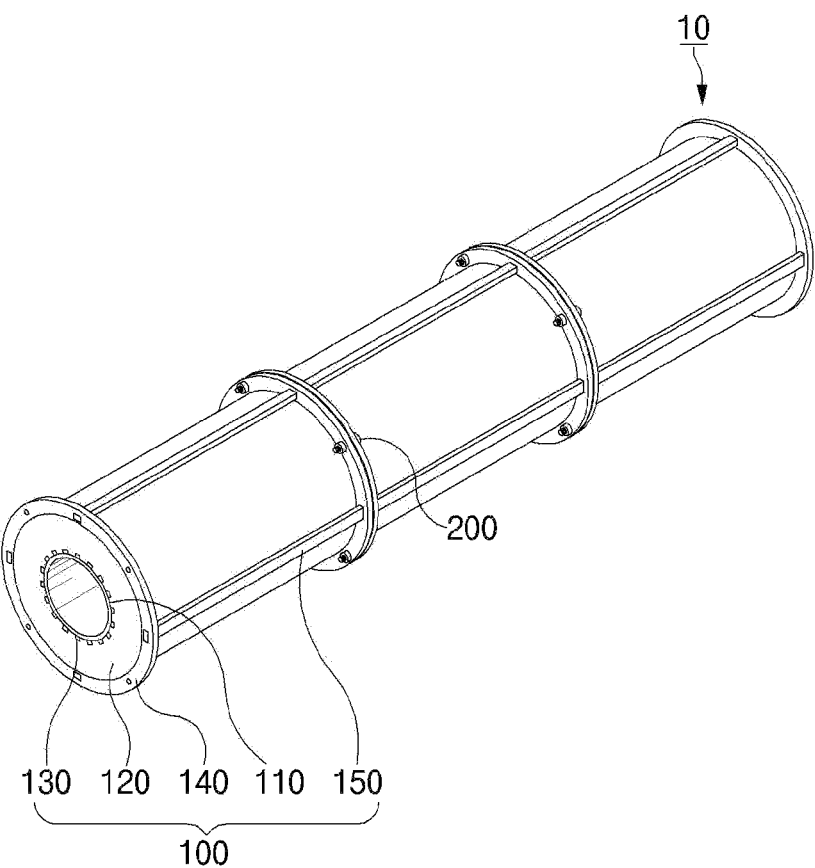

[FIG. 7]
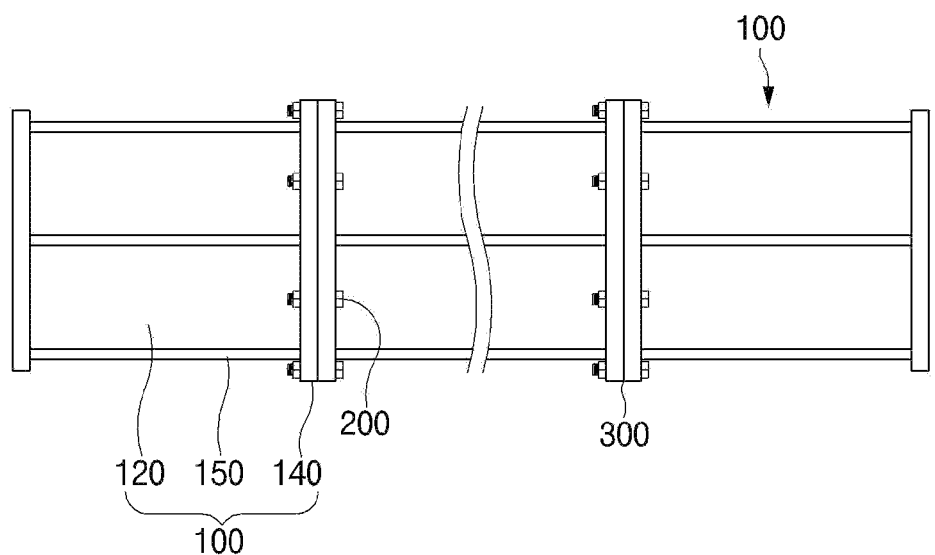

[FIG. 8]
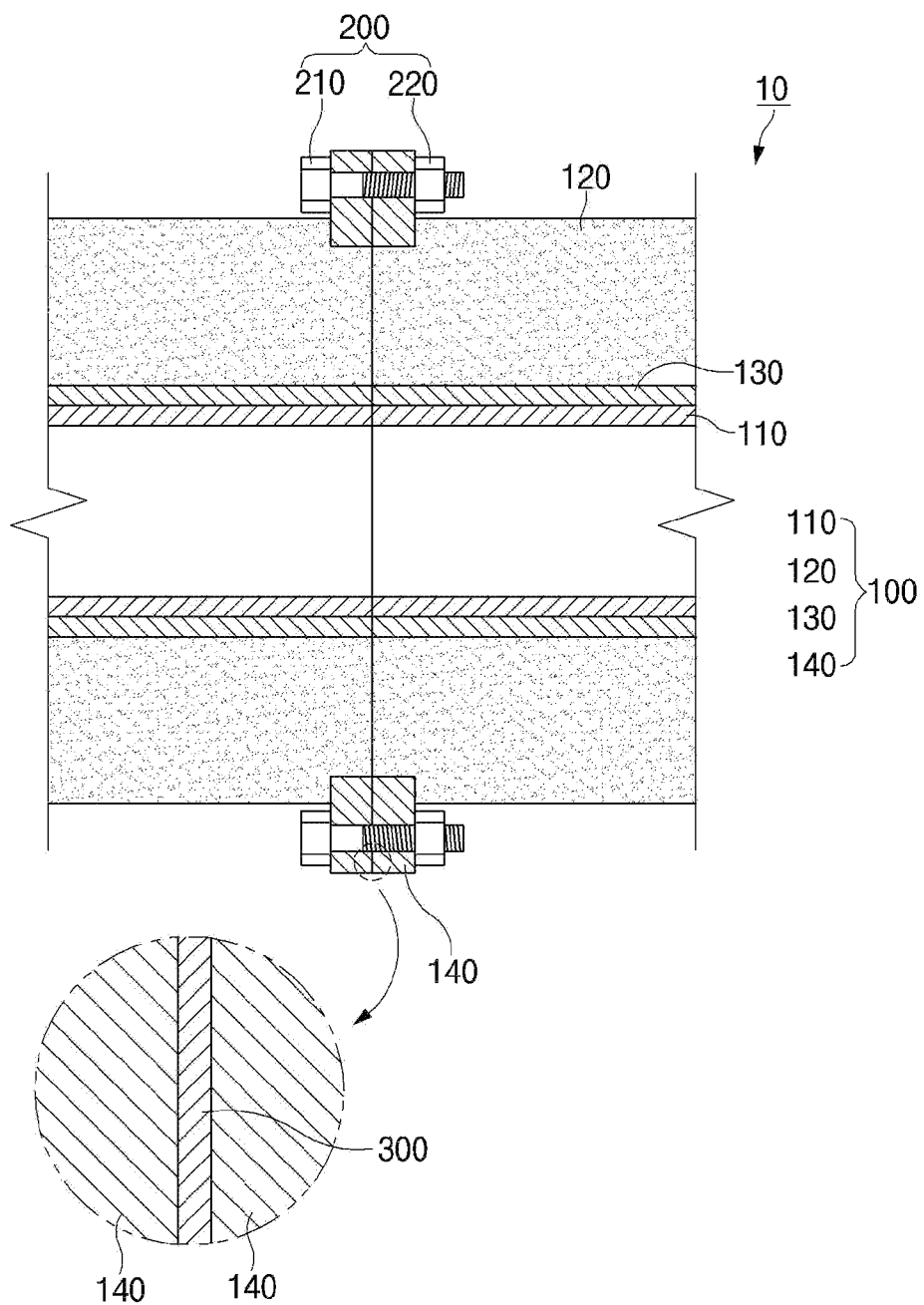

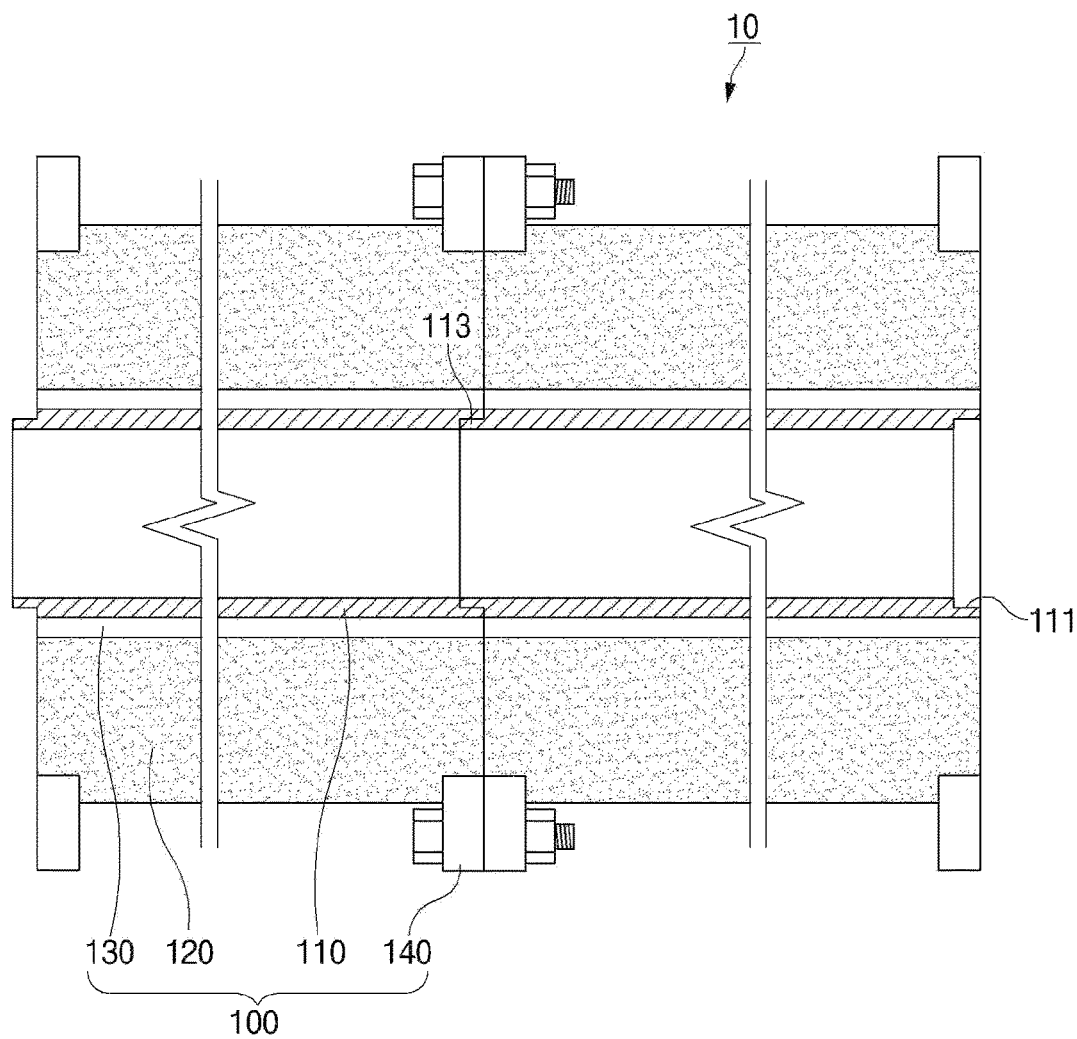
[FIG. 9]

[FIG. 10]
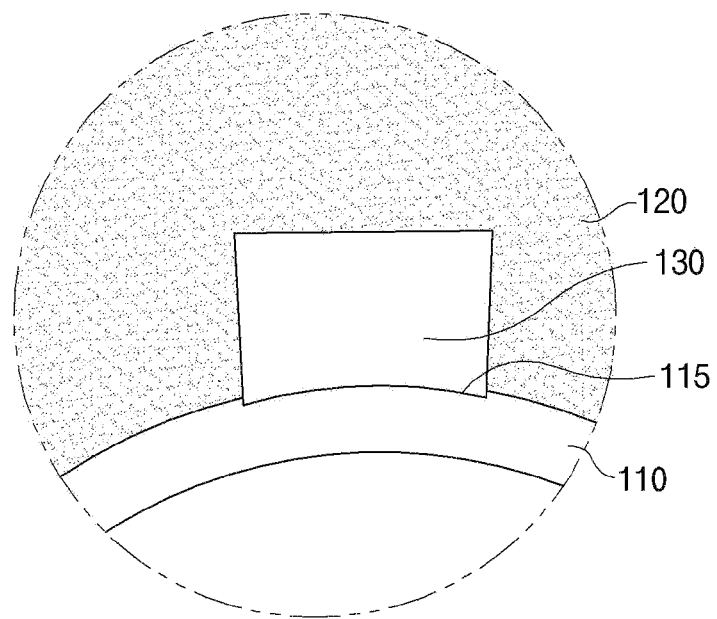

[FIG. 11]
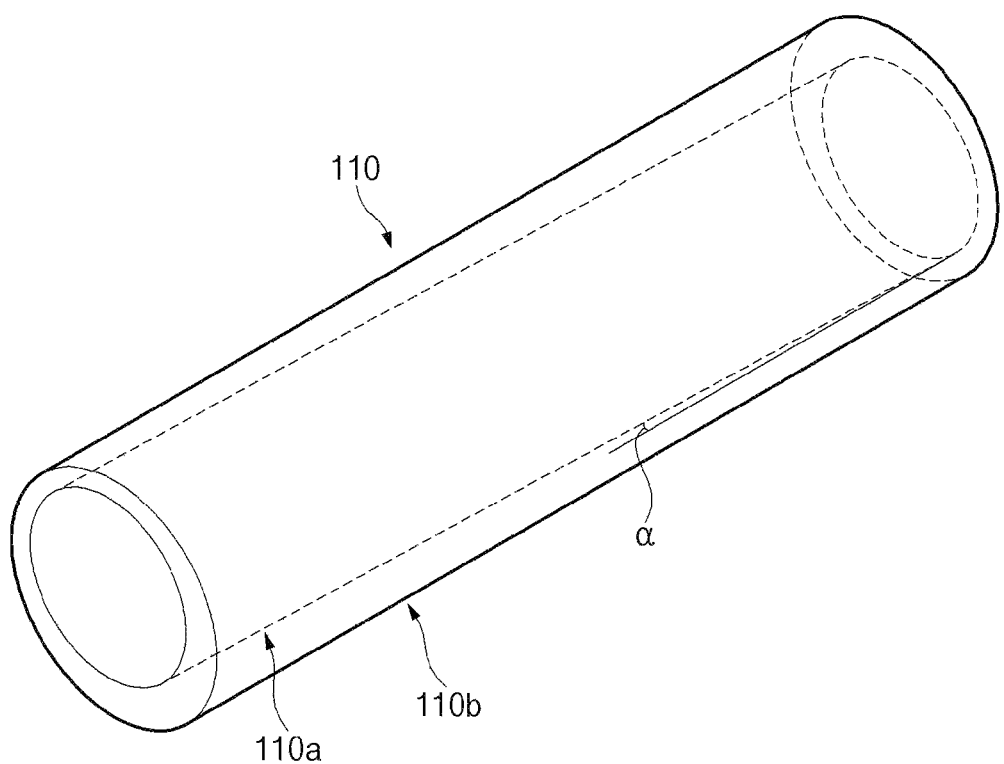

[FIG. 12]
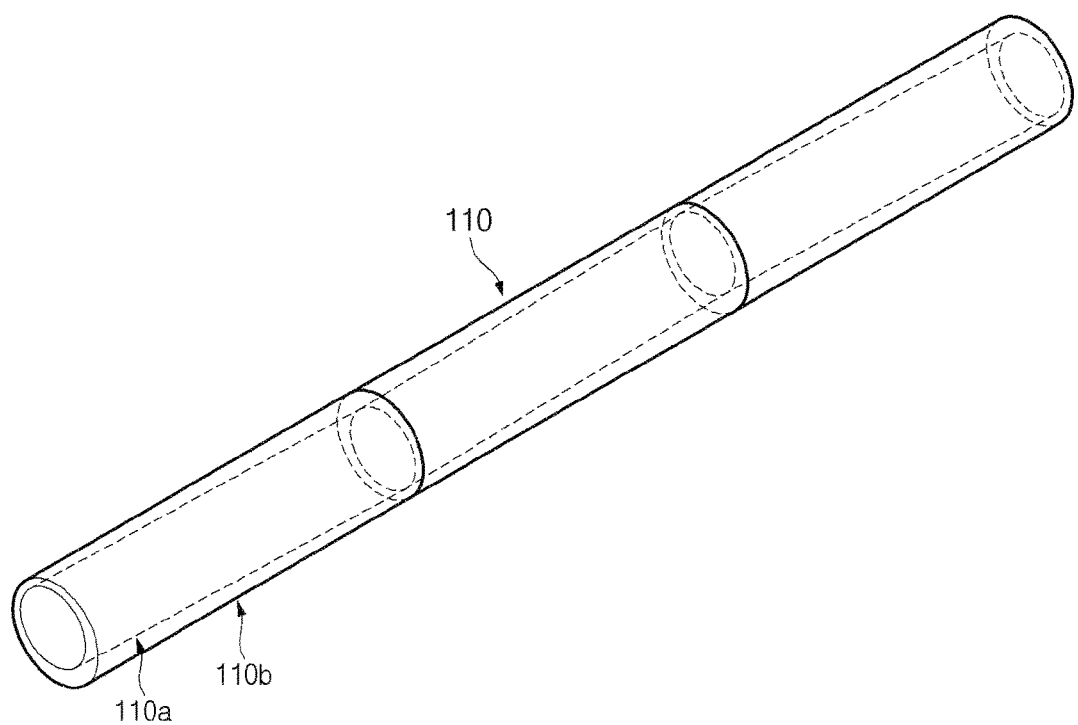

[FIG. 13]
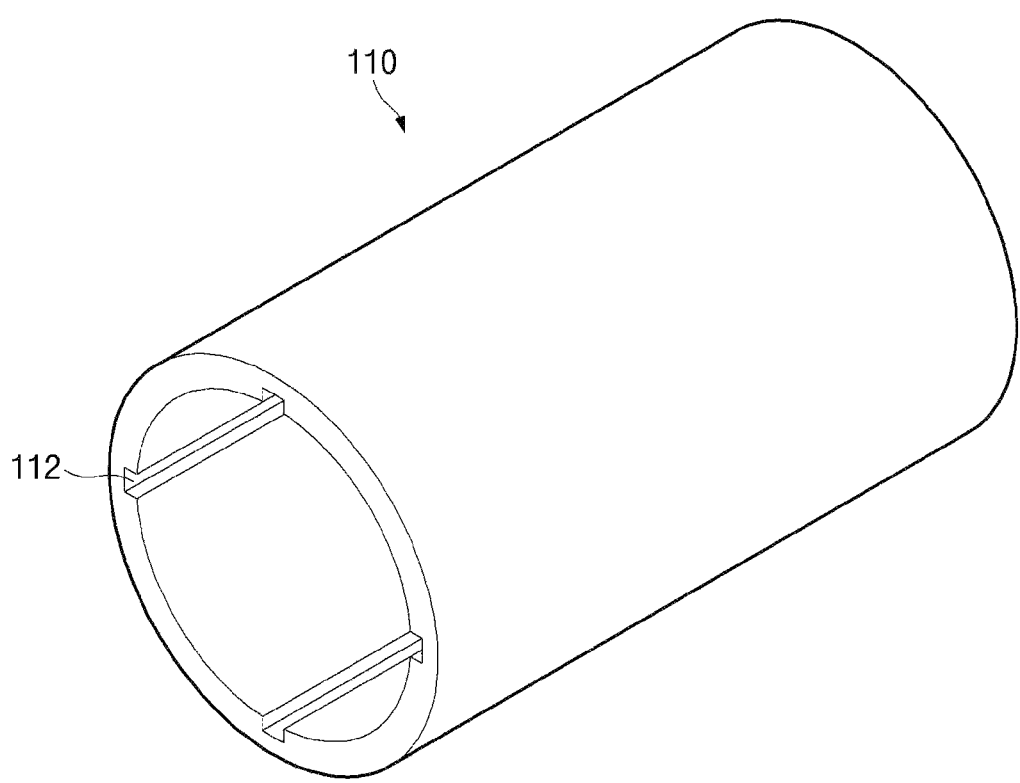

[FIG. 14]
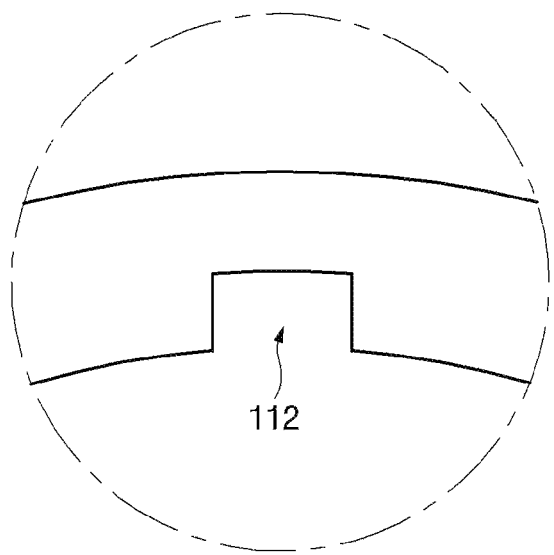
[FIG. 15]
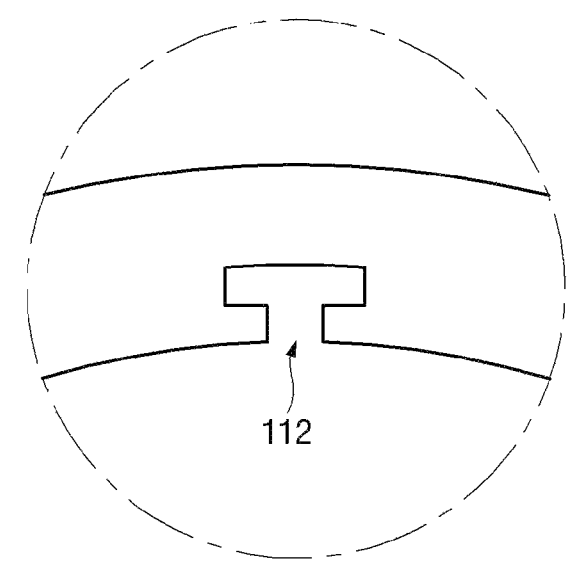

[FIG. 16]
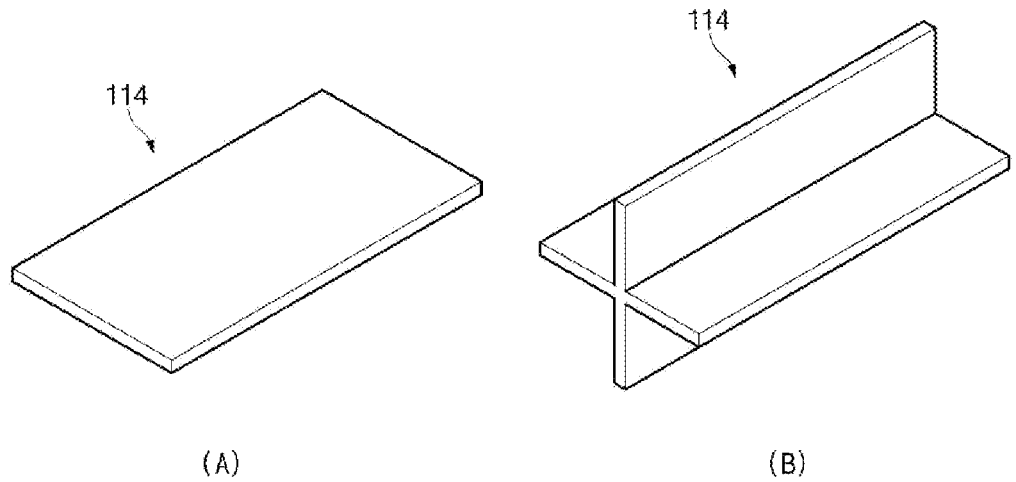
(A)　　　　　　　　　　　(B)
[FIG. 17]
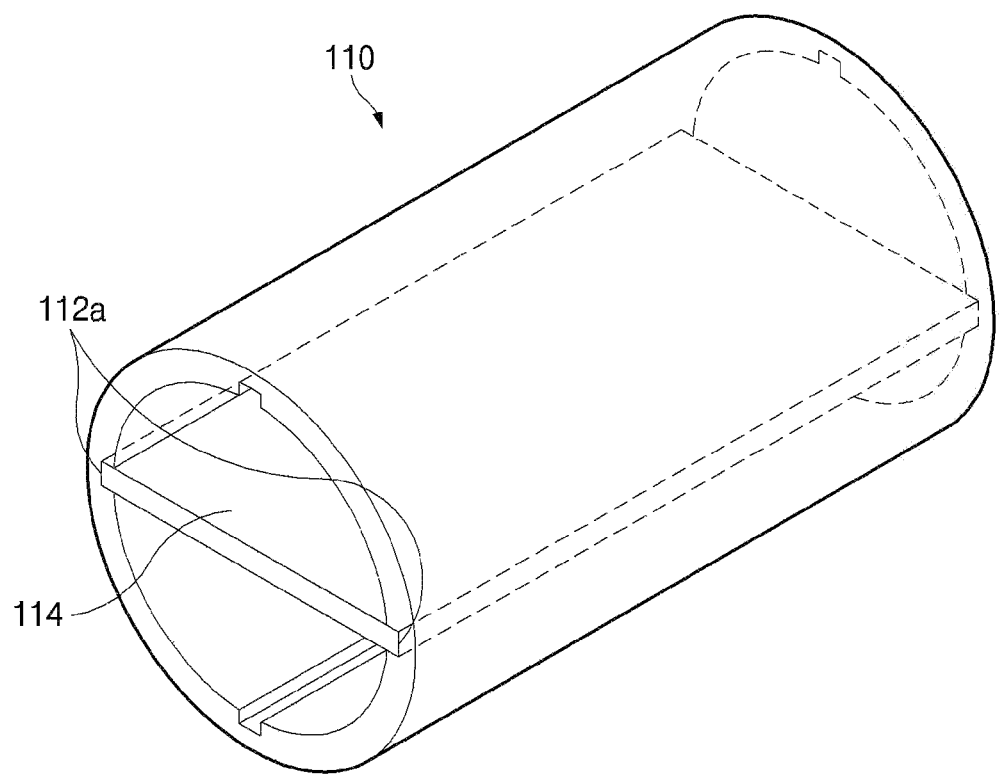

[FIG. 18]
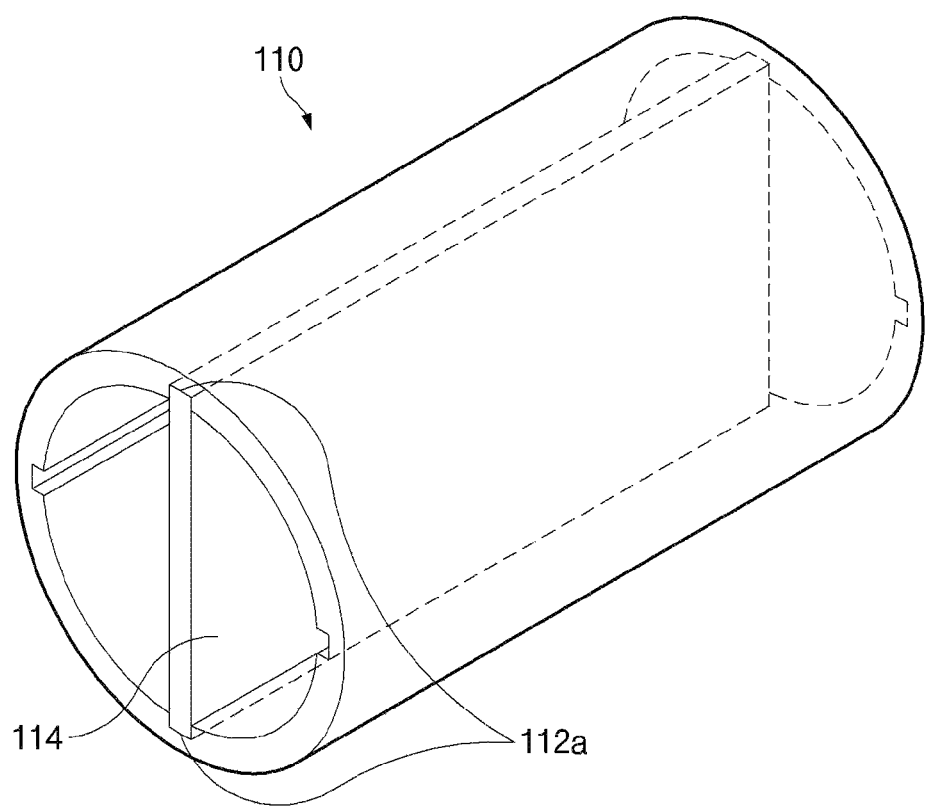

[FIG. 19]
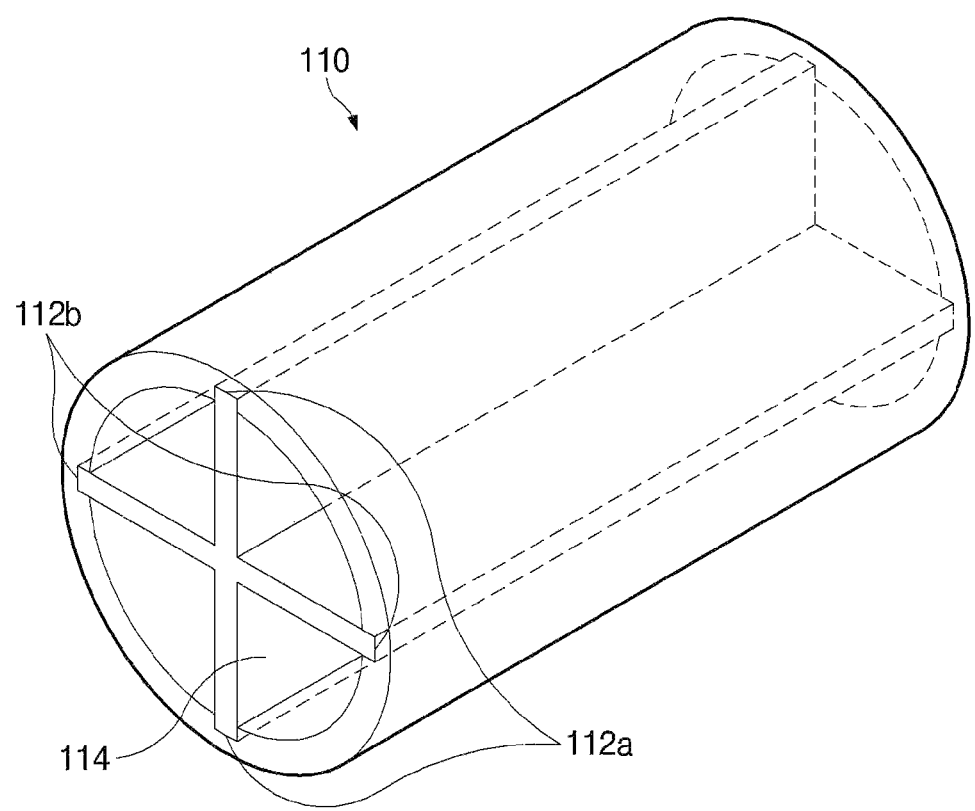

[FIG. 20]
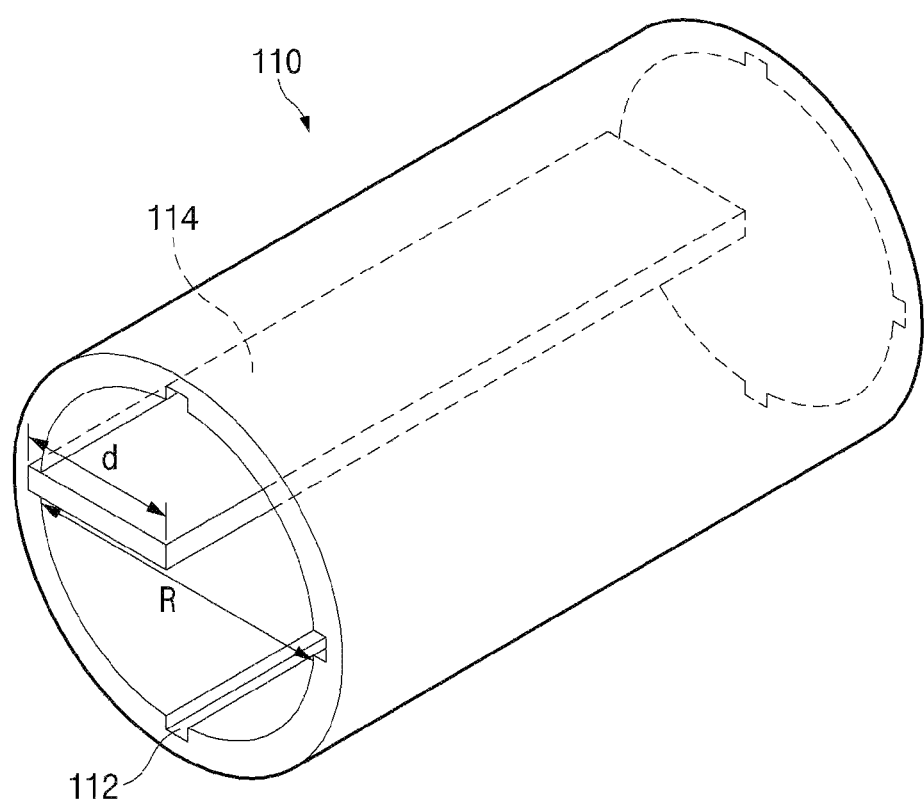

[FIG. 21]
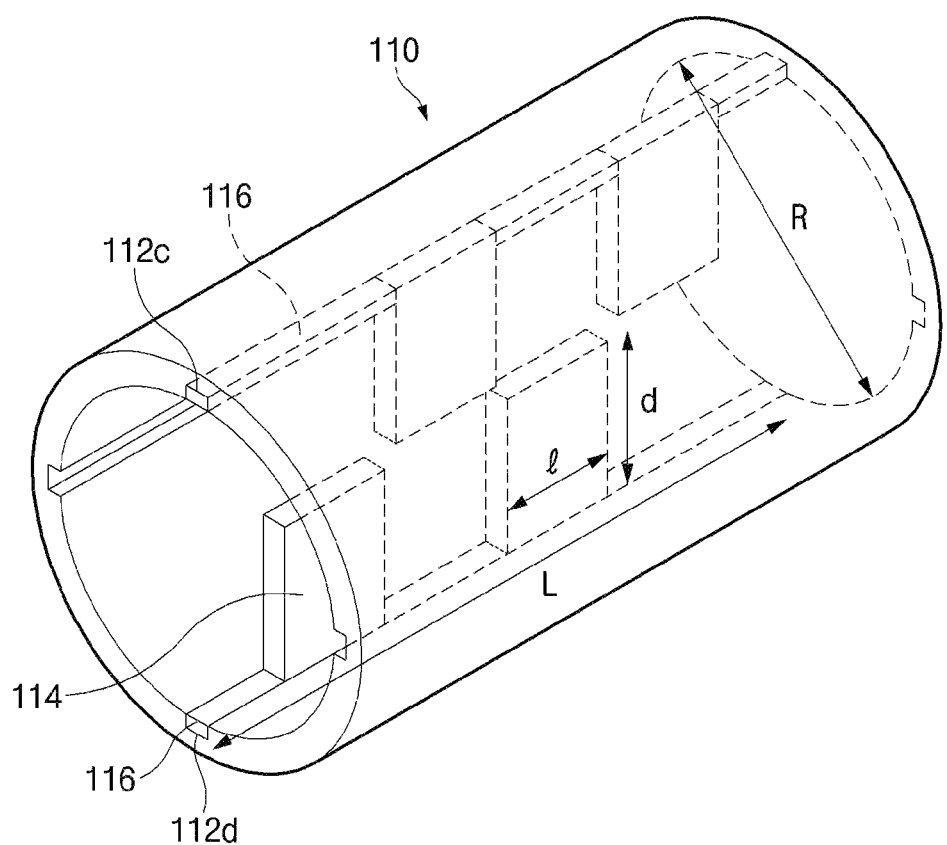

[FIG. 22]
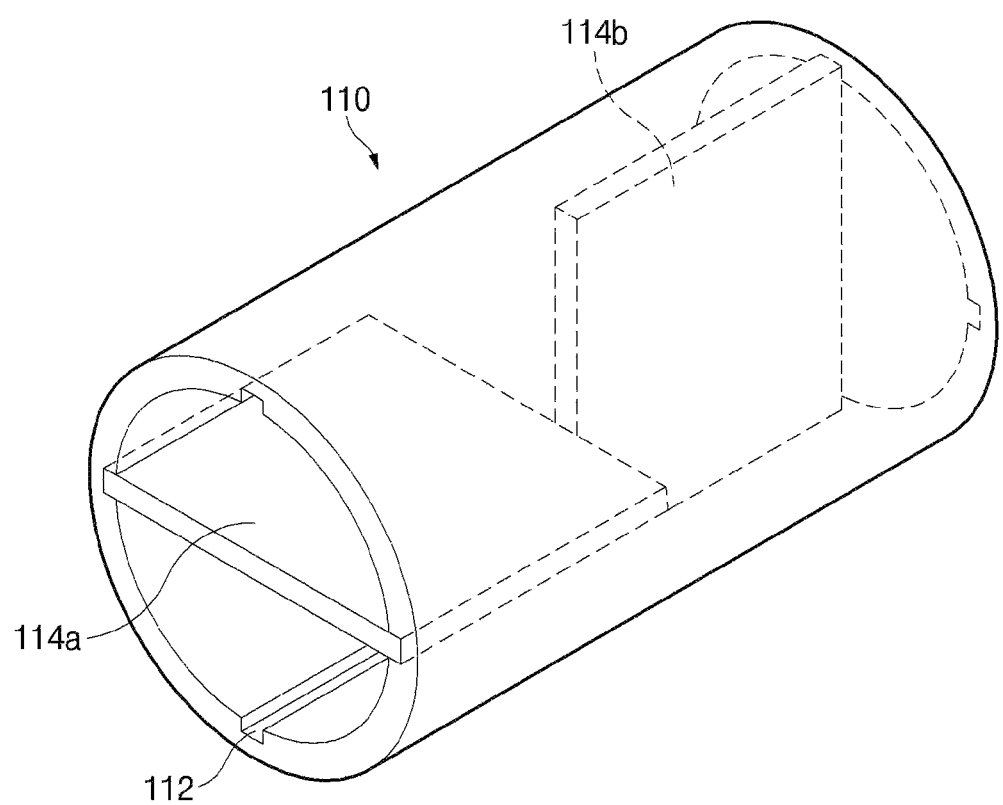

[FIG. 23]
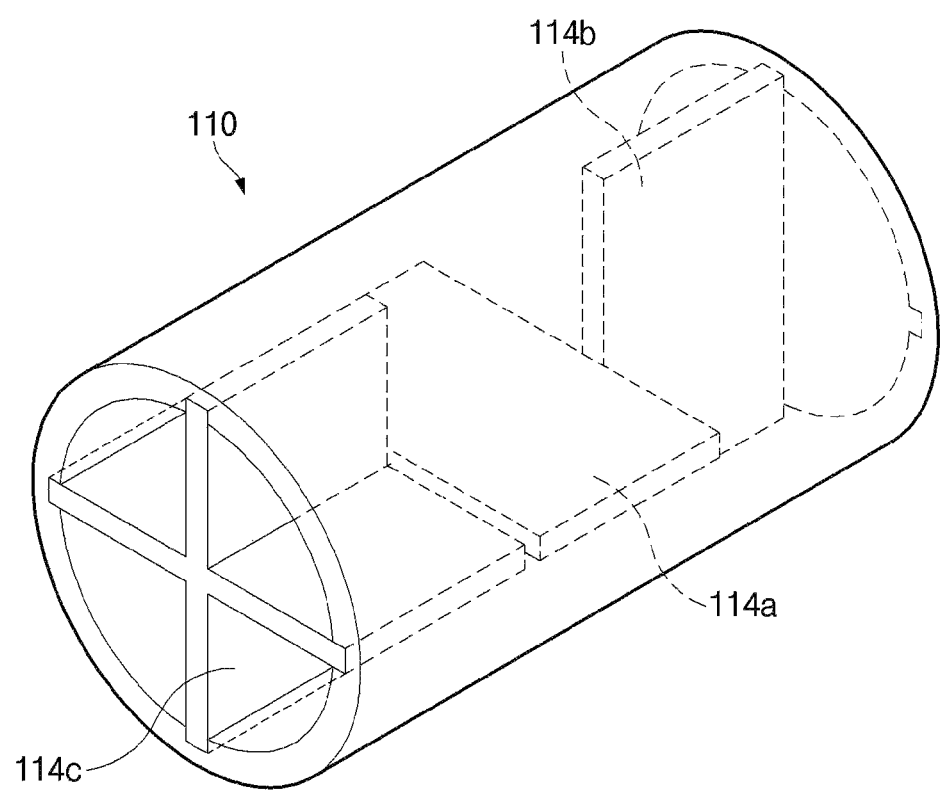

TUBE MODULE AND TUBE ASSEMBLY INCLUDING SAME

CROSS-REFERENCE TO RELATED APPLICATIONS

The present application is a national phase entry under 35 U.S.C. § 371 of International Application No. PCT/KR2021/007045, filed on Jun. 4, 2021, which claims the benefit of the priority of Korean Patent Application No. 10-2020-0068508, filed on Jun. 5, 2020, Korean Patent Application No. 10-2020-0125179, filed on Sep. 25, 2020, and Korean Patent Application No. 10-2020-0125180, filed on Sep. 25, 2020, which are hereby incorporated by reference in their entirety.

TECHNICAL FIELD

The present invention relates to a tube module, which is applied to a horizontal rotary kiln, and a tube assembly including same. More specifically, the present invention relates to a tube module, which is applied to a horizontal rotary kiln for manufacturing a positive electrode active material, and a tube assembly including same.

BACKGROUND ART

In general, secondary batteries refer to chargeable and dischargeable batteries unlike primary batteries that are not chargeable, and such a secondary battery is being widely used in the high-tech electronic fields such as phones, notebook computers, and camcorders.

Particularly, as technology development and demands for mobile devices increase, the demands for secondary batteries as energy sources are rapidly increasing. Among the secondary batteries, lithium secondary batteries having high energy density and voltage, a long cycle life, and a low self-discharge rate have been commercialized and widely used.

Meanwhile, such a lithium secondary battery uses a lithium transition metal oxide as a positive electrode active material. That is, a lithium cobalt oxide having a high operating voltage and excellent capacity characteristics, a lithium nickel oxidize having a high reversible capacity of about 200 mAh/g and easily achieving a large capacity battery, a lithium nickel cobalt oxide in which a portion of nickel is substituted with cobalt, a lithium nickel cobalt metal oxide in which a portion of nickel is substituted with manganese, cobalt, or aluminum, a lithium manganese-based oxide which is inexpensive and has excellent thermal stability, a lithium iron phosphate having excellent stability, or the like has been used as the positive electrode active material.

The positive electrode active material is manufactured through a method in which a precursor for manufacturing a positive electrode active material and a lithium raw material are mixed and then loaded to a heating device and fired at high temperature.

Here, a horizontal rotary kiln may be applied as the heating device. The horizontal rotary kiln includes a firing container, in which the precursor for manufacturing the positive electrode active material and the lithium raw material are accommodated and mixed while rotating in the horizontal direction, and a heating unit, which applies heat to the firing container and reacts the precursor with the lithium raw material.

Here, the firing container is generally made of a metal material.

However, when the firing is performed by using the firing container made of a metal material, the firing container reacts with the lithium raw material, and accordingly, corrosion may occur. Also, the positive electrode active material is polluted by metal ions coming from the firing container, and thus, the quality of the positive electrode active material deteriorates.

Also, when the firing container made of a metal material is used, a heat source such as a microwave may not be used, and accordingly, types of usable heat sources are limited.

PRIOR ART DOCUMENT (Patent Document 1) Korean Patent Publication No. 10-2004-0069156

DISCLOSURE OF THE INVENTION

Technical Problem

The present invention has been made to solve the above problem, and an object of the present invention is to provide a tube module which may include a tube and a heat insulator made of ceramic materials, thus preventing corrosion of the tube and the heat insulator due to reaction with reaction raw materials. Accordingly, a positive electrode active material may be prevented from being polluted by metal ions coming from a metal container, and various heat sources such as microwaves may be applied.

Also, an object of the present invention is to provide a tube assembly, which includes flanges for connecting tube modules in a longitudinal direction and thus may process a large amount by connecting two or more tube modules, and a positive electrode active material firing apparatus including same.

Technical Solution

To achieve the object described above, a tube module of the present invention may include: a tube having a bore in a core portion and made of a ceramic material; a heat insulator surrounding an outer circumferential surface of the tube and made of a ceramic material; and a flange provided along an edge of each of both surfaces of the heat insulator and formed in a band shape.

Meanwhile, a tube assembly of the present invention may include: a plurality of tube modules arranged in a longitudinal direction; and a coupling member which connects and couples the plurality of tube modules arranged in the longitudinal direction. Each of the tube modules is the tube module described above according to the present invention, and the coupling member couples the flange of the tube module to the flange of the corresponding tube module and connects the plurality of tube modules in the longitudinal direction.

Meanwhile, a positive electrode active material firing apparatus of the present invention includes the tube assembly according to the present invention.

Advantageous Effects

The tube module of the present invention includes the tube made of ceramic, the heat insulator made of ceramic, and the flange provided on each of both the surfaces of the heat insulator. Accordingly, corrosion of the tube and the heat insulator may be prevented, and the reaction raw material, i.e., the positive electrode active material may be prevented from being polluted due to the corrosion, and as a result, the uniformity of quality of the positive electrode active material may be enhanced.

Also, when the tube and the heat insulator are formed of the ceramic material as in the present invention, heat sources may be diversified because transmission of the microwave or the like is possible unlike the metal material.

Particularly, the tube module of the present invention includes the plurality of susceptors between the tube and the heat insulator, and the plurality of susceptors are provided equidistantly on the outer circumferential surface of the tube. Thus, the susceptors may be easily installed on the outer circumferential surface of the tube, and as a result, coupling properties between the tube and the susceptors may be enhanced.

Meanwhile, the arrangement portions, on which the susceptors are arranged, are provided on the outer circumferential surface of the tube in the tube module of the present invention, and the arrangement portions are provided in the form of arrangement grooves. Thus, the plurality of susceptors may be conveniently arranged on the outer circumferential surface of the tube, and the susceptors may be prevented from moving along the outer circumferential surface of the tube.

Also, the susceptor in the tube module of the present invention has the long bar shape to be connected from the one side of the tube to the other side in the longitudinal direction. Thus, the uniform heating temperature may be maintained in the longitudinal direction of the tube, and accordingly, the uniformity of quality of the positive electrode active material within the tube may be enhanced.

Also, the tube module of the present invention includes the reinforcing bar. Thus, strength of the heat insulator may be enhanced, and accordingly, the outer shape of the tube module may be stably maintained.

Also, when the bore inside the tube is formed in the inclined structure as in the present invention, the raw materials are uniformly mixed during rotation of the tube, and thus, the firing uniformity may be enhanced.

Also, when the inner wall of the tube includes at least one baffle coupling portion to and from which the baffle is attached and detached as in the present invention, the baffle is mounted to the baffle coupling portion so that the raw materials are uniformity mixed during rotation. Thus, even when the large amounts of raw materials are loaded, the firing may be performed more uniformly than in the related art. Also, not only may various types of the baffles be arranged in the baffle coupling portions in various configurations, but various baffles may be applied in one tube. Thus, the baffles capable of producing the best effects are used according to the firing conditions and raw materials to be loaded, and accordingly, the firing quality may be further enhanced.

Also, the tube assembly of the present invention includes: the tube modules which each include the tube made of the ceramic material, the heat insulator made of the ceramic material, and the flange provided on each of both the surfaces of the heat insulator; and the coupling member which couples the plurality of tube modules so as to be connected in the longitudinal direction through the flanges of the tube modules. Thus, the tube modules utilizing the ceramic materials may be connected to the desired length, and accordingly, the large amount of the reaction raw materials, i.e., the positive electrode active materials may be processed. That is, it is very difficult to manufacture the tube and the heat insulator made of the ceramic materials with the certain diameter and length or more due to the material characteristics, and the production costs are significantly high. Accordingly, the plurality of tubes and heat insulators made of the ceramic materials with the certain diameters and lengths may be connected to the desired length through the flanges and the coupling members, and as a result, it is possible to process the large amount.

BRIEF DESCRIPTION OF THE DRAWINGS

FIG. 1 is a perspective view illustrating a tube module according a first embodiment of the present invention, FIG. 2 is a front view of FIG. 1, FIG. 3 is a side view of FIG. 1, FIG. 4 is a cross-sectional view of FIG. 1, and FIG. 5 is a partially enlarged view of FIG. 2.

FIG. 6 is a perspective view illustrating a tube assembly according to a sixth embodiment of the present invention, FIG. 7 is a side view of FIG. 6, and FIG. 8 is a partially cross-sectional view of FIG. 6.

FIG. 9 is a cross-sectional view illustrating a tube module according to a second embodiment of the present invention.

FIG. 10 is a partially enlarged view illustrating a tube module according to a third embodiment of the present invention.

FIG. 11 is a see-through view illustrating a tube of a tube module according to a fourth embodiment of the present invention, and FIG. 12 is a see-through view exemplifying a connection state of the tube according to the fourth embodiment.

FIG. 13 is a perspective view illustrating a tube of a tube module according to a fifth embodiment of the present invention, and FIGS. 14 and 15 are views exemplifying cross-sectional shapes of baffle coupling portions according to the fifth embodiment.

FIG. 16 is a view illustrating examples of baffles applied in the tube module according to the fifth embodiment, and FIGS. 17 to 23 are views illustrating various examples of tubes to which baffles are coupled.

MODE FOR CARRYING OUT THE INVENTION

Hereinafter, embodiments of the present invention will be described in detail with reference to the accompanying drawings so as to be easily carried out by a person skilled in the art to which the present invention pertains. However, the present invention may be implemented in various different forms, and is not limited to the embodiments described herein. Also, in the drawings, parts irrelevant to the description will be omitted to clearly describe the present invention, and similar elements will be designated by similar reference numerals throughout the specification.

[Tube Module According to a First Embodiment of the Present Invention]

As described in FIGS. 1 to 5, a tube module 100 according to a first embodiment of the present invention includes a tube 110 made of a ceramic material, a heat insulator 120 made of a ceramic material, a susceptor 130 provided between the tube 110 and the heat insulator 120, a flange 140 provided on each of both surfaces of the heat insulator, and a reinforcing bar 150 that maintains strength and an outer shape of the heat insulator 120.

Meanwhile, the flange 140 serves to connect a plurality of tube modules, in which a ceramic material is used, in a longitudinal direction.

Tube

The tube 110 is made of a ceramic material and has a cylindrical shape with a bore so that a reaction raw material having a powder shape may be loaded therein.

Here, the tube 110 made of the ceramic material is made of high-purity alumina, and accordingly, reaction with a reaction raw material accommodated within the tube 110 may be minimized.

Here, the tube 110 may include at least one selected from the group consisting of oxide (e.g., alumina, zirconia, quartz, mullite), nitride (e.g., silicon nitride), and carbide (e.g., silicon carbide) among ceramic materials.

Heat Insulator

The heat insulator 120 is made of a ceramic material and provided in a shape surrounding an outer circumferential surface of the tube 110, and absorbs heat generated from the tube 110 or the susceptor 130 to prevent the heat from being diffused to the outside.

Meanwhile, the ceramic has high thermal resistance and is resistant to a strong acid or base and even to corrosive conditions. Accordingly, the tube 110 and the heat insulator 120 made of the ceramic materials may prevent corrosion due to a reaction raw material, i.e., a positive electrode active material, and may also prevent the occurrence of pollution of the positive electrode active material due to the corrosion.

Here, the heat insulator 120 may include at least one or two or more selected from the group consisting of quartz, mullite, and alumina among ceramic materials.

Susceptor

The susceptor 130 is provided between the tube 110 and the heat insulator 120, and generates heat by microwaves to heat the reaction raw material accommodated in the tube 110.

Here, the susceptor 130 is provided in plurality so as to be arranged equidistantly along an outer circumferential surface of the tube 110, and accordingly, the susceptor 130 may be conveniently arranged on the outer circumferential surface of the tube 110.

Here, the susceptor 130 has a long bar shape to be connected from one side of the tube 110 to the other side in the longitudinal direction (from a left end of the tube to a right end when viewed in FIG. 3), and accordingly, heat having uniform temperature may be generated along the longitudinal direction of the tube 110.

Particularly, the susceptor 130 has a quadrangular cross-section, and accordingly, the contact surface between the tube 110 and the susceptor 130 may be increased to increase force for fixing the susceptor 130, and particularly, the susceptor 130 may be prevented from rotating.

Meanwhile, an extension part 131 having thermal insulating characteristics is further provided between the susceptor 130 and the susceptor 130 arranged equidistantly on the outer circumferential surface of the tube 110, and the extension part 131 may insulate heat between the susceptor 130 and the susceptor 130 to prevent the occurrence of non-uniform heating temperature, and particularly, the gap between the susceptor 130 and the susceptor 130 may be constantly maintained.

Meanwhile, the extension part 131 is formed integrally with the heat insulator 120, and accordingly, ease of manufacture may be achieved.

Meanwhile, the susceptor 130 may include at least one selected from the group consisting of SiC, graphite, carbon nanotubes, carbon nanofibers, and graphene, and preferably, is formed of a SiC material.

Flange

The flange 140 is for coupling and connecting a plurality of tube modules in the longitudinal direction, and is provided in each of both surfaces of the tube module in the longitudinal direction (the front surface and the rear surface when viewed in FIG. 1) and has a band shape provided along an edge of each of both the surfaces of the heat insulator 120.

Meanwhile, in the present invention, it is very difficult to manufacture the tube 110 and the heat insulator 120 made of the ceramic materials with the lengths of several hundred mm, several thousand mm, or more due to the material characteristics. Accordingly, a tube module, in which the tube 110 and the heat insulator 120 made of the ceramic materials are applied, is manufactured to a certain length, and then, a plurality of tube modules are connected by using the flanges 140, thus obtaining a tube module in which the ceramic materials having several hundred mm or several thousand mm are applied.

Meanwhile, the flange 140 is inserted into an insertion groove 121 formed along an edge of each of both the surfaces of the heat insulator 120, and accordingly, adhesion force and coupling force between the flange 140 and the heat insulator 120 may be enhanced. Also, an adhesive or a sealant may be further included between the flange 140 and the insertion groove 121, and accordingly, the coupling force between the flange 140 and the insertion groove 121 may be significantly increased.

Also, an externally exposed surface of the flange 140 and an externally exposed surface of the heat insulator 120 are positioned on the same horizontal line (on an X-line indicated in FIG. 4), and accordingly, when the plurality of the tube modules 100 are connected in the longitudinal direction, the entire corresponding surfaces of the corresponding tube modules may be brought into close contact with each other.

Reinforcing Bar

The at least one or more reinforcing bars 150 are provided on the outer circumferential surface of the heat insulator and reinforce strength of the heat insulator. Here, the reinforcing bar 150 has one surface supported by the heat insulator 120 and both ends respectively coupled to the flanges 140 provided on both the surfaces of the heat insulator 120. Accordingly, the reinforcing bar 150 may stably reinforce the strength of the heat insulator 120 through connectivity with the flange 140.

Particularly, the reinforcing bar 150 has a quadrangular cross-section, and accordingly, the reinforcing bar 150 coupled to the flange 140 may be prevented from rotating, and thus, the weakening of the coupling force between the flange 140 and the reinforcing bar 150 and the occurrence of foreign substances due to friction may be prevented.

Meanwhile, the flange 140 and the reinforcing bar 150 are made of metal or ceramic materials, and accordingly, the strength of the flange 140 and the reinforcing bar 150 may be significantly enhanced, and the tube 110, the heat insulator 120, the susceptors 130 may be stably protected from the outside.

Thus, the tube module 100 having the above structure according to a first embodiment of the present invention includes the tube and the heat insulator made of the ceramic materials and the flanges respectively provided on both the surfaces of the heat insulator. Accordingly, the corrosion of the tube and the heat insulator due to the reaction raw material may be prevented, the pollution of the positive electrode active material may be prevented as the corrosion of the tube is prevented, and the tube module having a preset size may be obtained because the plurality of tube modules manufactured to certain sizes may be connected. Particularly, heat sources such as microwaves may be diversified.

Hereinafter, in describing another embodiment of the present invention, components having the same functions as those in the embodiment described above are given the same reference numerals, and their duplicated description will be omitted.

[Tube Module According to a Second Embodiment of the Present Invention]

As illustrated in FIG. 9, a tube module 100 according to the second embodiment of the present invention has a structure enhancing a coupling force between a tube 110 of a tube module 100 and a tube 110 of a corresponding tube module 100.

That is, a coupling groove 111 is formed on one side surface of the tube 110 (the left surface of the tube when viewed in FIG. 9) along the circumferential surface, and a coupling protrusion 113 is formed on the other side surface (the right surface of the tube in FIG. 9) along the circumferential surface.

Thus, in the tube module 100 according to the second embodiment of the present invention, when a plurality of tube modules 100 are arranged in the longitudinal direction, coupling grooves 111 and coupling protrusions 113 of the tube modules 100 are arranged corresponding to each other. As a result, a tube 110 of a tube module 100 and a tube 110 of a corresponding tube module 100 may be coupled and sealed through the coupling groove 111 and the coupling protrusion 113.

Meanwhile, an adhesive layer having thermal resistance may be further included between the coupling groove 111 and the coupling protrusion 113 coupled to each other, and accordingly, the sealing force between the coupling groove 111 and the coupling protrusion 113 may be significantly enhanced.

Meanwhile, the coupling groove 111 and the coupling protrusion 113 may be coupled in an interference fit manner or in a screw fastening manner.

[Tube Module According to a Third Embodiment of the Present Invention]

As illustrated in FIG. 10, in a tube module 100 according to the third embodiment of the present invention, an outer circumferential surface of a tube 110 has an arrangement portion 115 on which each of a plurality of susceptors 130 is disposed. The susceptors 130 may be conveniently arranged on the outer circumferential surface of the tube 110 through the arrangement portions 115.

As one example, the arrangement portion 115 is an arrangement groove recessed toward the inside of the tube 110, and the susceptor 130 may be inserted into and disposed in the arrangement groove.

Thus, in the tube module 100 according to the third embodiment of the present invention, the plurality of susceptors 130 may be conveniently installed on the outer circumferential surface of the tube 110 without a separate installation device, and the susceptor 130 may be firmly prevented from moving to the outer circumferential surface of the tube 110.

Meanwhile, an adhesive layer having thermal resistance may be further included between the arrangement portion and the susceptor 130, and the coupling force between the arrangement portion and the susceptor 130 may be enhanced through the adhesive layer.

[Tube Module According to a Fourth Embodiment of the Present Invention]

As illustrated in FIG. 11, a tube module 100 according to the fourth embodiment of the present invention may include a tube 110 having a structure in which an inner bore is inclined in one direction, for example, in a direction from one end of the tube to the other end. Here, the tube module 100 has the same structure and function of the tube modules described in the first embodiment to the fourth embodiment except that the bore inside the tube 110 is formed in an inclined structure, and thus, duplicated description will be omitted.

When the bore inside the tube is formed in the inclined structure as described above, the rotation degree of raw materials changes according to regions inside the tube during the rotation of the tube module, and thus, the mixing of the raw materials may be more uniformly performed compared to the tube in which the bore is formed in parallel.

The inclined structure may be formed by differently forming the thickness of a tube inner wall 110a along the longitudinal direction of the tube 110. That is, in the tube 110 according to the present invention, the thickness of the inner wall of the tube in the longitudinal direction may increase or decrease.

Also, it is preferable that an inclination angle α of the bore is formed less than an inclination angle of the tube module when the tube module is mounted to a horizontal rotary kiln, that is, an angle between the tube module and the ground of the kiln. This is because the raw material may flow backward or flowability may deteriorate, when the inclination angle of the bore is greater than the inclination angle of the tube module.

Specifically, the bore may have a structure inclined at an angle of 1° to 10° with respect to an outer wall 110b of the tube, preferably, at an angle of 3° to 5°.

Meanwhile, when a tube assembly 10 is formed by using the tube modules 100 that include the tubes 110 in which the inner bores are formed in the inclined shapes as described above, neighboring tubes 110 may be connected as illustrated in FIG. 12 such that slopes of the inclination structures of the bores are different from each other. For example, as the tube modules are rotated at 180 degrees and alternately arranged and connected when the tube modules are assembled, the slopes of the bore inclination structures of the tube modules may become different from each other.

When the slopes of the bore inclination structures of the neighboring tube modules are different as described above, a difference in height of the raw material increases at a connection portion of the tube modules during the rotation of the tube assembly, and thus, the mixing effect of the raw material may be further improved.

[Tube Module According to a Fifth Embodiment of the Present Invention]

As illustrated in FIG. 13, a tube module 100 according to the fifth embodiment of the present invention may include a tube 110 that includes a baffle coupling portion 112 in an inner wall. Here, the tube module 100 has the same structure and function of the tube modules described in the first embodiment to the fourth embodiment except that the baffle coupling portion 112 is formed in the inner wall of the tube 110, and thus, duplicated description will be omitted.

The baffle coupling portion 112 is formed such that a baffle may be attached to and detached from, and it is sufficient to have a shape capable of inserting and separating the baffle and supporting the baffle when the baffle is inserted, and the shape thereof is not particularly limited. For example, the baffle coupling portion 112 may have a groove shape extending in the longitudinal direction of the tube 110 and recessed in a direction from the inner wall to the outer wall as illustrated in FIG. 13, but is not limited thereto. A shape such as a support rail protruding from the tube inner wall toward the bore is possible. The shape of the groove is not particularly limited. For example, the groove has a quadrangular cross-section as illustrated in FIG. 14, or may have a T-shaped cross-section as illustrated in FIG. 15. Although not illustrated in the drawings, the cross-section having a half circle, a triangle, a polygon, or the like is possible.

As the baffle coupling portion 112, to and from which the baffle may be attached and detached, is provided in the inner wall of the tube 110 as described above, various types of the baffles may be attached and detached inside the tube in various arrangement configurations. Thus, the baffles capable of producing the best effects are selected and used according to the firing conditions and the types or contents of raw materials to be loaded.

In the tube module 100, at least one baffle 114 may be coupled to the baffle coupling portion 112. It is sufficient that the baffle 114 may induce uniform mixing of the raw material, and the shape thereof is not particularly limited. For example, the baffle 114 may have a plate shape or a cross shape as illustrated in FIG. 16, but is not limited thereto. Baffles having various shapes such as a half circle or a triangle may be used. Also, a distal end of the baffle 114 inserted into the baffle coupling portion 112 may have a cross-sectional shape corresponding to the shape of the baffle coupling portion 112. For example, when the baffle coupling portion 112 has the T-shaped cross-section as illustrated in FIG. 15, the distal end of the baffle 114 inserted into the baffle coupling portion 112 may also have the T-shape cross-section.

Meanwhile, it is preferable that the baffle 114 is made of a ceramic material. When the baffle 114 is made of a ceramic material, corrosion due to reaction with a reaction raw material and pollution of a raw material may be prevented, and microwaves may be transmitted therethrough.

Meanwhile, the baffle 114 may be applied in the tube module 100 in various arrangement configurations. FIGS. 17 to 23 illustrate examples of tubes in which baffles are coupled.

According to one example, a tube 110 of the present invention includes one pair or more of baffle coupling portions 112a formed at positions symmetric with respect to a central axis of the tube 110 as illustrated in FIGS. 17 and 18, and one baffle 114 may be coupled to the pair of the baffle coupling portions 112a. Here, the baffle 114 may be coupled so as to be disposed in a direction parallel to the longitudinal direction of the tube 110 as illustrated in FIG. 17, or may be coupled so as to be disposed in a direction perpendicular to the longitudinal direction of the tube 110 as illustrated in FIG. 18.

According to another example, a tube 110 of the present invention includes two pairs of baffle coupling portions 112a and 112b formed at positions symmetric with respect to a central axis of the tube 110 as illustrated in FIG. 19, and a baffle 114 having a cross-shaped cross-section may be coupled to the two pairs of the baffle coupling portions.

Meanwhile, FIGS. 17 to 19 illustrate that the baffle 114 has the width corresponding to the inner diameter of the tube 110 and has the length corresponding to the length of the tube, but are not limited thereto. A baffle 114 having a width d smaller than an inner diameter R of a tube 110 may be applied as illustrated in FIG. 20, and a baffle having a length l smaller than a length L of the tube may also be applied as illustrated in FIG. 21.

Meanwhile, FIGS. 17 to 20 illustrate that one baffle 114 is applied in the tube 110, but are not limited thereto. Two or more baffles may be coupled to one tube 110. FIGS. 21 to 23 illustrate examples of tubes in which two or more baffles are applied.

According to one example, in a tube 110 of the present invention as illustrated in FIG. 21, plate-shaped baffles 114, which have a width d smaller than an inner diameter R of the tube and a length l smaller than a length L of the tube, may be spaced a constant distance along the longitudinal direction of the tube and coupled to baffle coupling portions 112. For example, the baffles 114 have a width less than or equal to ½ of the inner diameter R of the tube, and one or more baffles are coupled to each of baffle coupling portions 112c and 112d formed at positions symmetric with respect to a central axis of the tube, that is, the baffle coupling portion 112c positioned in an upper portion of the tube in the drawing and the baffle coupling portion 112d positioned in a lower portion of the tube in the drawing. Here, the baffles coupled to the upper baffle coupling portion and the baffles coupled to the lower baffle coupling portion may be disposed so as to be offset from each other along the longitudinal direction of the tube as illustrated in FIG. 21, or may be disposed at corresponding positions.

According to another example, in a tube 110 of the present invention, two or more baffles may be coupled to a baffle coupling portion in different arrangements. For example, as illustrated in FIG. 22, a baffle may be coupled in one region inside the tube so as to be disposed in parallel to the longitudinal direction of the tube, and a baffle may be coupled in the other region inside the tube so as to be disposed perpendicularly to the longitudinal direction of the tube.

According to another example, in a tube 110 of the present invention, two or more baffles 114a, 114b, and 114c having different shapes and/or arrangements may be coupled to baffle coupling portions 112c and 112d. For example, as illustrated in FIG. 23, a baffle having a cross shape may be coupled in one region inside the tube, a baffle having a plate shape may be coupled in another region inside the tube so as to be disposed in parallel to the longitudinal direction of the tube, and a baffle having a plate shape may be coupled in the other region inside the tube so as to be disposed perpendicularly to the longitudinal direction of the tube.

Meanwhile, when two or more baffles are applied in one baffle coupling portion, a fixing member 116 may be further provided as needed so as to fix the baffles to the baffle coupling portions 112c and 112d (see FIG. 21). The fixing member 116 serves to fix the positions of the baffles 114 and adjust a spaced distance between the baffles 114. Specifically, the baffle 114 may be supported by the fixing member 116 to prevent the baffle from moving left and right, and a distance between the baffles may be adjusted according to the length of the fixing member 116. Also, although not illustrated in the drawing, the fixing member may be applied even in a baffle coupling portion to which a baffle is not coupled. When the fixing member is applied in the baffle coupling portion to which the baffle is not coupled, a raw material may be prevented from being stuck in an empty baffle.

Although the examples of the tubes, in which the baffles according to the present invention are applied, have been described with reference to the drawings, the tube modules according to the present invention are not limited to those illustrated in the drawings but may be modified into various shapes and/or arrangements.

In the case of a horizontal rotary kiln according to the related art, when a loading volume exceeds 10 volume % of a tube, raw materials slide along a tube inner wall during rotation of the tube, and the raw materials are not appropriately mixed. Thus, firing is not performed uniformly, and an amount of raw materials to be loaded is limited, and accordingly, there is a limitation in increasing the production. However, when the baffle 114 is disposed inside the tube as in the present invention, the bore inside the tube 110 is partitioned by the baffle 114, and raw materials collide with the baffle 114 and then drop during the rotation of the tube module. Thus, the phenomenon in which the raw materials slide along the tube inner wall is reduced, and the raw materials are actively mixed. Accordingly, the firing may be performed uniformly even in the case where a larger amount of raw materials are loaded than in the related art.

Also, when two or more baffles having different shapes and/or arrangements are included in one tube, the degree of mixing the raw material may be changed according to the firing conditions inside the tube, thus further enhancing the firing quality. For example, in a front end portion of the tube in which the temperature rises, several baffles having smaller widths may be used, or a large baffle such as a cross-shaped baffle having a large area in contact with raw materials may be used, thereby actively mixing the raw materials. In a rear end portion of the tube in which the temperature drops, a plate-shaped baffle having a relatively small area in contact with raw materials or a baffle having a small width may be used, thereby minimizing dusts and damages to fired products.

[Tube Assembly According to a Sixth Embodiment of the Present Invention]

As illustrated in FIGS. 6 to 8, a tube assembly 10 according to the sixth embodiment of the present invention includes: a plurality of tube modules 100 arranged in a longitudinal direction; and a coupling member 200 which connects and couples the plurality of tube modules 100 arranged in the longitudinal direction.

Tube Module

Each of the tube modules 100 includes a tube 110 having a bore and made of a ceramic material, a heat insulator 120 surrounding an outer circumferential surface of the tube 110 and made of a ceramic material, a susceptor 130 disposed between the tube 110 and the heat insulator 120, a flange 140 provided along an edge of each of both surfaces of the heat insulator 120 and formed in a band shape, and a reinforcing bar 150 reinforcing strength of the heat insulator 120.

Here, the tube module 100 has the same structure and function as the tube modules described in the first embodiment to the fifth embodiment, and accordingly, duplicated description will be omitted.

Coupling Member

The coupling member 200 is for connecting a plurality of tube modules in the longitudinal direction as illustrated in FIG. 8, and couples a flange 140 of a tube module 100 and a flange 140 of a corresponding tube module 100, thus connecting the plurality of tube modules 100 in the longitudinal direction.

That is, referring to FIG. 8, the coupling member 200 includes a coupling bolt 210 which passes through a flange 140 of one side-tube module 100 and a flange 140 of the other side-tube module 100 which are in close contact with each other, and a coupling nut 220 which is coupled to the coupling bolt 210 that passes through the flange 140 of the other side-tube module 100. The plurality of tube modules 100 may be connected in the longitudinal direction through the coupling between the coupling bolt 210 and the coupling nut 220.

Particularly, an adhesive layer 300 having thermal resistance may be further included between the one side-tube module 100 and the other side-tube module 100 which are in close surface contact with each other, and the adhesive layer 300 may significantly enhance the bonding force and sealing force between the one side-tube module 100 and the other side-tube module 100 which are in close surface contact with each other.

Thus, in the tube assembly 10 having the above structure according to the sixth embodiment of the present invention, the module tube 110, which includes the tube 110 and the heat insulator 120 made of the ceramic materials, may be manufactured to a length of several hundred or several thousand mm or more. Accordingly, the tube module 100 may be configured to process a large amount of the reaction raw material, i.e., the positive electrode active material.

[Positive Electrode Active Material Firing Apparatus According to a Seventh Embodiment of the Present Invention]

The positive electrode active material firing apparatus according to the seventh embodiment of the present invention includes a tube assembly which is equipped with a plurality of tube modules 100 and a coupling member 200 connecting and coupling the plurality of tube modules 100 in the longitudinal direction.

Here, the tube module assembly may have the same structure as the tube assembly described in the sixth embodiment, and accordingly, duplicated descriptions will be omitted.

The positive electrode active material firing apparatus may be a horizontal rotary firing apparatus that rotates about a rotary axis parallel to the longitudinal direction of the tube module 100 during the firing.

In the positive electrode active material firing apparatus according to the present invention, the tube assembly, in which the plurality of tube modules made of the ceramic materials are connected in the longitudinal direction, is applied, and thus, the large amount of the positive electrode active material may be processed, and accordingly, the working efficiency may be significantly improved and working time may be significantly reduced. Particularly, the positive electrode active materials having uniform quality may be obtained.

Also, the tube and the heat insulator of the positive electrode active material firing apparatus of the present invention are made of the ceramic materials, and thus, the microwave heat source may be applied.

The scope of the present invention is defined by the appended claims rather than the foregoing description, and various embodiments derived from the meaning and scope of the claims and their equivalent concepts are also possible.

The invention claimed is:
1. A tube module comprising:
   a tube having a bore and made of a ceramic material;
   a heat insulator surrounding an outer circumferential surface of the tube and made of a ceramic material;
   a flange provided along an edge of each of both surfaces of the heat insulator and formed in a band shape; and
   a plurality of susceptors between the tube and the heat insulator and arranged along the outer circumferential surface of the tube,
   wherein heat insulating material extends between a first susceptor and a second susceptor of the plurality of susceptors.
2. The tube module of claim 1, wherein each susceptor of the plurality of susceptors has a long bar shape to be connected from one side of the tube to the other side in a longitudinal direction.

3. The tube module of claim 1, wherein the outer circumferential surface of the tube has an arrangement portion on which each susceptor of the plurality of susceptors is disposed.

4. The tube module of claim 1, wherein the heat insulator has an insertion groove which is formed along the edge of each of both the surfaces and into which the flange is inserted.

5. The tube module of claim 4, wherein an externally exposed surface of the flange and an externally exposed surface of the heat insulator are positioned on the same horizontal line.

6. The tube module of claim 1, further comprising one or more reinforcing bars which are provided on an outer circumferential surface of the heat insulator and reinforce the strength of the heat insulator.

7. The tube module of claim 6, wherein each of the reinforcing bars has one surface supported by the heat insulator and both ends respectively coupled to the flanges provided on both the surfaces of the heat insulator.

8. The tube module of claim 6, wherein the flange or the reinforcing bar is made of a metal or ceramic material.

9. The tube module of claim 1, wherein an inner wall of the tube has at least one baffle coupling portion which a baffle is configured to be attached to and detached from.

10. The tube module of claim 9, wherein the at least one baffle coupling portion has a groove shape recessed in a direction from the inner wall of the tube toward an outer wall and extending in a longitudinal direction of the tube.

11. The tube module of claim 9, wherein at least one baffle is coupled to the at least one baffle coupling portion.

12. The tube module of claim 9, wherein a fixing member configured to fix the baffle is coupled to the at least one baffle coupling portion.

13. The tube module of claim 1, wherein two or more baffles having different shapes or arrangement forms are coupled to an inside of the tube.

14. A tube assembly comprising:
a plurality of tube modules arranged in a longitudinal direction; and
a coupling member which connects and couples a first tube module and a second tube module of the plurality of tube modules arranged in the longitudinal direction,
wherein in the plurality of tube modules each tube module is according to claim 1, and
the coupling member couples the flange of the first tube module to the flange of the second tube module and connects the first tube module and the second tube module of the plurality of tube modules in the longitudinal direction.

15. The tube assembly of claim 14, wherein at least one tube module of the plurality of tube modules further comprises one or more reinforcing bars that reinforce the strength of the heat insulator.

16. The tube assembly of claim 14, further comprising an adhesive layer between the first tube module and the second tube module.

17. The tube assembly of claim 14, wherein at least one tube of the plurality of tube module tubes has a coupling groove formed on one side along a circumferential surface and a coupling protrusion formed on the other side along the circumferential surface, and the at least one tube of the plurality tube modules and tubes of corresponding adjacent tube modules of the plurality of tube modules are coupled and sealed through the coupling groove and the coupling protrusion.

18. The tube assembly of claim 17, wherein the coupling groove and the coupling protrusion are coupled through a screw coupling manner.

19. A positive electrode active material firing apparatus comprising the tube assembly of claim 14.

20. A tube module comprising:
a tube having a bore and made of a ceramic material;
a heat insulator surrounding an outer circumferential surface of the tube and made of a ceramic material;
a flange provided along an edge of each of both surfaces of the heat insulator and formed in a band shape,
wherein the tube has a structure in which the bore is inclined in a direction from one end of the tube to a second end.

21. The tube module of claim 20, wherein a thickness of an inner wall of the tube increases or decreases in a longitudinal direction.

22. The tube module of claim 20, wherein the tube module is applied to a horizontal rotary kiln, and
an inclination angle of the bore is less than an inclination angle of the tube module when the tube module is mounted to the horizontal rotary kiln.

23. The tube module of claim 20, wherein the bore has a structure inclined at an angle of 1° to 10° with respect to an outer wall of the tube.

* * * * *